J. R. GAMMETER.
MACHINE FOR TRIMMING CIRCULAR RUBBER ARTICLES.
APPLICATION FILED DEC. 7, 1915.
1,261,017.
Patented Apr. 2, 1918.
2 SHEETS—SHEET 1.
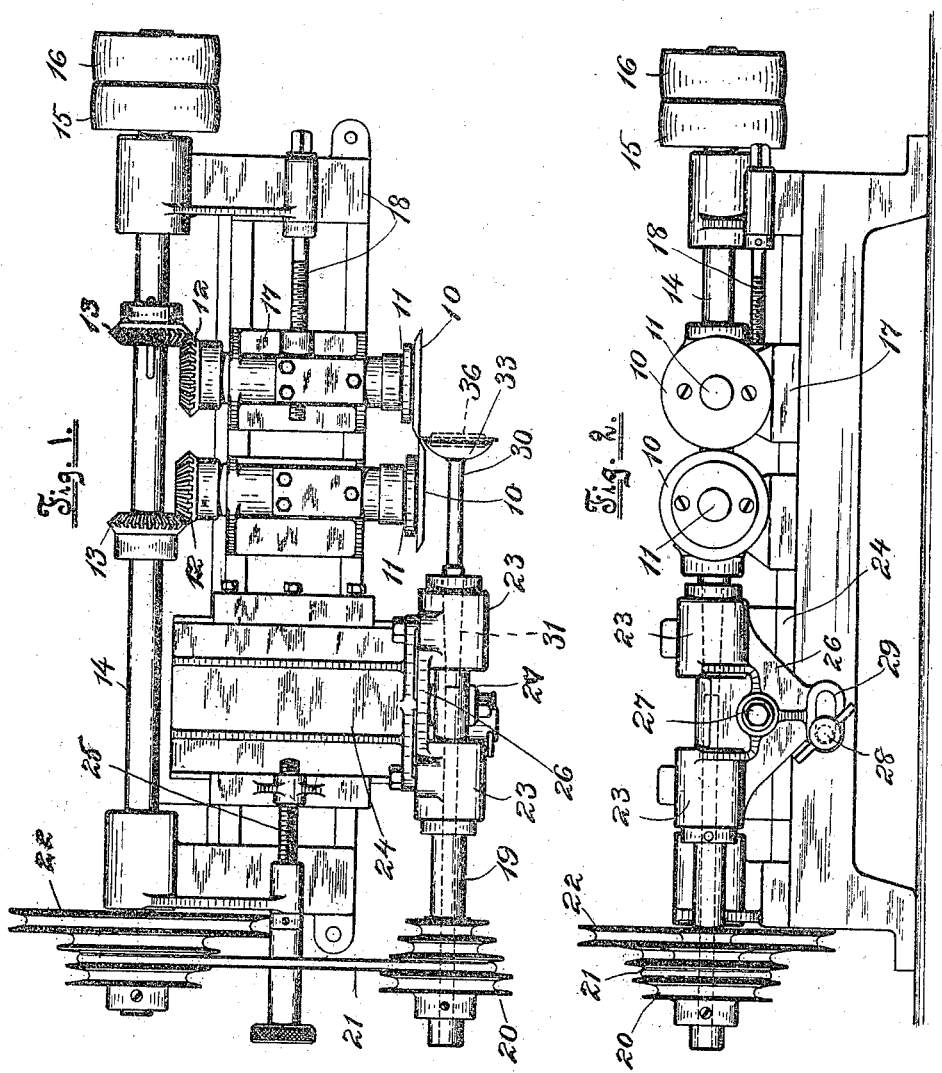
Inventor.
J. R. Gammeter
By Robert M. Pierson
Attorney J. R. GAMMETER.
MACHINE FOR TRIMMING CIRCULAR RUBBER ARTICLES.
APPLICATION FILED DEC. 7, 1915.
1,261,017.
Patented Apr. 2, 1918.
2 SHEETS—SHEET 2.
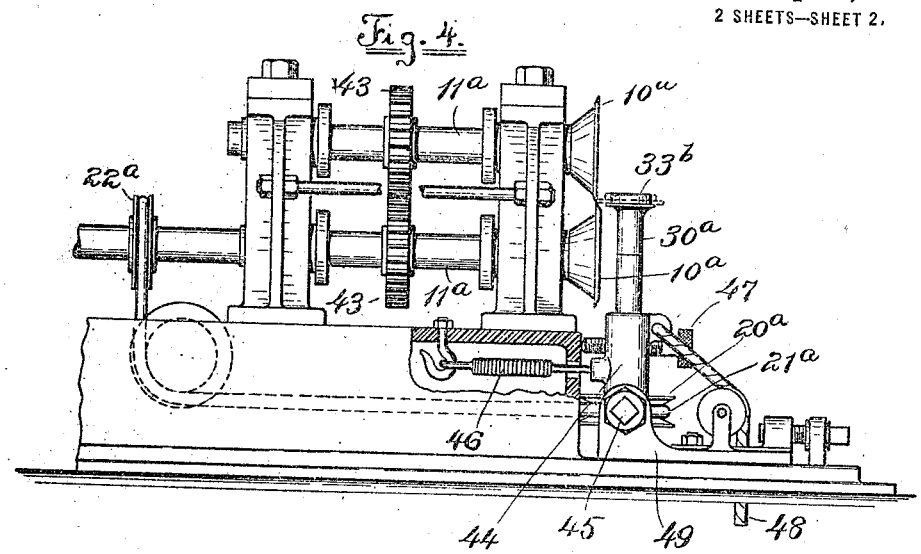
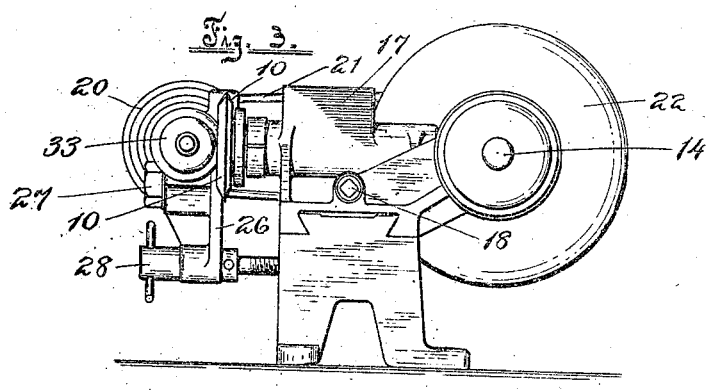
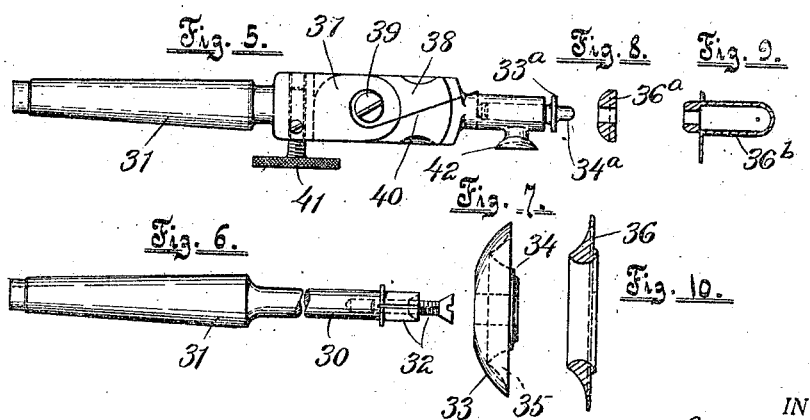
INVENTOR.
J. R. Gammeter
BY Robert M. Pierson
ATTORNEY

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

MACHINE FOR TRIMMING CIRCULAR RUBBER ARTICLES.

1,261,017.  Specification of Letters Patent.  Patented Apr. 2, 1918.

Application filed December 7, 1915. Serial No. 65,498.

*To all whom it may concern:*

Be it known that I, JOHN R. GAMMETER, a citizen of the United States, residing at Akron, in the county of Summit and State of Ohio, have invented certain new and useful Improvements in Machines for Trimming Circular Rubber Articles, of which the following is a specification.

This invention relates to a machine for trimming the rind or fin of excess rubber left by the molding process on small circular rubber articles, my object being to supplant the hand trimming methods which have heretofore been followed, and thereby to effect a very considerable saving of time and labor.

Of the accompanying drawings,

Figure 1 represents a top plan view showing one form of my improved trimming machine.

Fig. 2 represents a front elevation thereof.

Fig. 3 represents a side view.

Fig. 4 represents a side elevation, partly broken away, showing a modification.

Fig. 5 represents a plan view of an adjustable work-holder support which may be employed.

Fig. 6 represents an elevation, partly broken away, showing a work-rotating spindle.

Fig. 7 represents an elevation of one form of work-holder.

Figs. 8, 9 and 10 represent in section three different forms of rubber articles which may be subjected to the action of the machine.

Referring at first to Figs. 1 and 2, 10, 10 represent a pair of circular disk knives mounted on shafts 11 and adapted to be rapidly rotated in opposite directions by means of bevel gears 12 on the rear ends of said shafts, engaging complemental gears 13 on a shaft 14 provided with fast and loose belt-pulleys 15, 16. The two disk knives or cutters 10 are beveled in opposite directions and arranged with their adjacent cutting edges tangent or slightly overlapping, the shaft of one of the knives being mounted in a bearing-slide 17, adjustable on guides toward and from the other shaft, by means of a screw 18.

19 is a work-rotating shaft having a stepped, grooved belt-pulley 20 connected by a belt 21 with an oppositely-stepped grooved pulley 22 on the shaft 14, whereby the work shaft may be rapidly rotated and its speed with relation to that of the knives varied at will. Preferably the direction of rotation of the adjacent edges of the knives is downward, and the direction of rotation of the inner edge of the work is also downward.

Shaft 19 is mounted on bearings 23 on a slide 24 which is adjustable on guides in the direction of the length of said shaft, so that the position of the work horizontally with reference to the median line between the knives may be properly adjusted, the said slide being shifted by means of a screw 25. Provision is also made for adjusting the position of the work vertically with reference to the knives, and its point of tangency with respect to the cutting plane is preferably slightly above a horizontal line connecting the axes of the two shafts 11. Such provision in this case takes the form of a tilting frame 26 on which the shaft bearings 23 are mounted and which is supported on a pivot stud 27 on the slide 24, together with a clamping bolt 28 which occupies a slot 29 in the frame 26 and screws into the base of the machine.

In Figs. 1 and 6, 30 is a work-rotating spindle having a taper 31 on its rear end adapted to fit in a corresponding taper in the shaft 19, and on its front end having a suitable split-arbor and wedge-screw connection 32 for detachably carrying different forms of work-holders. These work-holders vary in shape with that of the various rubber articles for which the machine is intended, but they all are provided with some form of projection or recess co-axial with the spindle 30, for fitting in a corresponding recess or projection on the work in order to center the latter and secure sufficient frictional contact between the holder and the work to enable the latter to be rotated by the holder and subjected to the action of the knives 10. The work is manually applied endwise to the exposed end of the holder, and similarly removed therefrom, while the machine is running, and said exposed end of the holder constitutes the sole means, in conjunction with the operator's fingers, for supporting the work in position to be trimmed. Therefore the trimming operation is very rapidly performed and a large output secured.

Figs. 1 and 7 represent a holder 33 provided with a projection 34 and a concentric recess 35 adapted for a rubber article 36 of the shape shown in Fig. 10.

Figs. 8 and 9 represent other shapes of rubber articles 36ª, 36ᵇ with which a holder 33ª having a projection 34ª, as shown in Fig. 5, may be employed. Such a holder as 33ª may be provided with a suitable connection for mounting it on a positively-rotated spindle, such as 30, or it may be mounted in a stationary, inwardly-adjustable work-holder support, such as shown in Fig. 5, the latter comprising a fixed member 37 having a taper 31 for mounting it in shaft 19 (which is held stationary by disconnecting the belt 21 when this form of support is employed) and an adjustable member 38 hinged thereto at 39. Member 38 is thrown outwardly by a spring 40 to a position determined by a stop-screw 41 on member 38, and it has a thumb-piece 42 whereby the operator may displace the member 38 against the pressure of spring 40 to bring the work into trimming relation with the knives. In this case the work is rotated by the drag of the knives, and the shank of work-holder 33ª preferably rotates loosely in a suitable bearing in the end of member 38. A work-support such as shown in Fig. 5 may be used with rubber articles of such small diameter as would otherwise endanger the operator's fingers in applying and removing the work, the tip of the operator's fore-finger only being pressed lightly against the outer end of the work to assist in holding the latter in place while being trimmed.

In connection with a positively-rotated work-holder such as shown in Figs. 1 and 7, the operator centers the work on the rapidly rotating holder 33, and, by merely holding it against the latter with a light endwise pressure of the fingers, causes the work to be rotated by frictional contact with the holder and trimmed by the action of the knives 10.

In Fig. 4, I have represented a vertical form of the machine in which the shafts 11ª of the two knives 10ª are mounted one above the other and directly connected by spur gears 43. The work spindle 30ª in this case is vertical and rotated by belt 21ª and belt-pulleys 20ª and 22ª. It is mounted in a bearing 44 pivoted at 45 to an adjustable slide 49 and drawn inwardly by a spring 46 to a working position determined by a stop-screw 47, the bearing 44 being drawn outwardly for the purpose of locating the work on the holder 33ᵇ by means of a cord 48 leading to a treadle (not shown).

I claim:

1. In a trimming machine of the character specified, the combination, with suitable tangent disk-trimming knives and means for operating the same at a relatively high speed, of a rotary work-holder supported from its rear end and having a front end formed with frictional work-engaging and centering means exposed for endwise manual application thereto and removal therefrom of a complementally-formed rubber article while the machine is running, said exposed end of the work-holder being on an axis of rotation extending lengthwise and alongside of the plane of the knives, and adapted for operatively supporting the work in position to be trimmed by the action of said knives.

2. In a trimming machine of the character specified, the combination of a pair of circular trimming knives, means for rotating the same at a relatively high speed, a yieldingly-retracted work-holder support adapted to be manually forced toward the plane of the knives, and a rotary work-holder freely journaled on said support on an axis extending lengthwise of the plane of the knives and adapted to be rotated by the work, which in turn is rotated by the knives, said holder having frictional work-engaging and centering means on its outer end exposed for manual endwise application thereto and removal therefrom of a complementally-formed rubber article.

In testimony whereof I have hereunto set my hand this fourth day of December, 1915.

JOHN R. GAMMETER.